US010489374B2

(12) United States Patent
Barber et al.

(10) Patent No.: US 10,489,374 B2
(45) Date of Patent: Nov. 26, 2019

(54) IN-PLACE UPDATES WITH CONCURRENT READS IN A DECOMPOSED STATE

(71) Applicant: International Business Machines Corporation, Armonk, NY (US)

(72) Inventors: Ronald J. Barber, San Jose, CA (US); Bishwaranjan Bhattacharjee, Yorktown Heights, NY (US); Mohammad Sadoghi Hamedani, Chappaqua, NY (US); Guy M. Lohman, San Jose, CA (US); Chandrasekaran Mohan, San Jose, CA (US); Vijayshankar Raman, Sunnyvale, CA (US); Richard S. Sidle, Mountain View, CA (US); Adam J. Storm, Toronto (CA); Xun Xue, Markham (CA)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 14/727,346

(22) Filed: Jun. 1, 2015

(65) Prior Publication Data
US 2016/0350351 A1    Dec. 1, 2016

(51) Int. Cl.
*G06F 16/23*    (2019.01)
(52) U.S. Cl.
CPC ...... *G06F 16/2343* (2019.01); *G06F 16/2315* (2019.01); *G06F 16/2365* (2019.01); *G06F 16/2379* (2019.01)

(58) Field of Classification Search
CPC ......... G06F 17/30362; G06F 17/30371; G06F 17/30377; G06F 16/2343; G06F 16/2379; G06F 16/2315; G06F 16/2365
(Continued)

(56) References Cited

U.S. PATENT DOCUMENTS 5,280,612 A    1/1994  Lorie et al.
6,564,215 B1 *  5/2003  Hsiao .................. G06F 11/1469
(Continued)

OTHER PUBLICATIONS

Diaconu, C. et al., "Hekaton: SQL Server's Memory-Optimized OLTP Engine", Proceedings of the 2013 ACM SIGMOD International Conference on Management of Data (SIGMOD '13), Jun. 22-27, 2013, pp. 1243-1254, ACM, United States.
(Continued)

*Primary Examiner* — James Trujillo
*Assistant Examiner* — Jessica N Le
(74) *Attorney, Agent, or Firm* — Sherman IP LLP; Kenneth L. Sherman; Steven Laut

(57) ABSTRACT

A method includes setting, by an update processor, a write latch in a first data structure associated with an object. The first data structure is copied to a storage structure. A history tuple sequence number (TSN) of the first data structure is set to point to a TSN of the copied first data structure. The version identifier is set to point to a transaction identification for the object. Data portions are updated for the first data structure. The version identifier is read from the first data structure. It is determined whether the version identifier of the first data structure is visible for a transaction including isolation requirements. If version identifier of the first data structure is visible, the first data structure is accessed and it is determined whether the version identifier of the first data structure changed since starting the transaction.

17 Claims, 13 Drawing Sheets

(58) Field of Classification Search
USPC .......................................................... 707/704
See application file for complete search history.

(56) References Cited

U.S. PATENT DOCUMENTS

| | | | |
|---|---|---|---|
| 7,933,881 B2 | 4/2011 | Richey et al. | |
| 8,214,353 B2* | 7/2012 | Inturi | G06F 16/256 |
| | | | 707/715 |
| 2005/0278393 A1* | 12/2005 | Huras | G06F 17/30368 |
| 2006/0004556 A1* | 1/2006 | Nelson | G06F 17/5022 |
| | | | 703/14 |
| 2007/0118523 A1* | 5/2007 | Bresch | G06F 17/30362 |
| 2007/0219999 A1* | 9/2007 | Richey | G06F 17/30356 |
| 2008/0201290 A1* | 8/2008 | Ponmudi | G06F 16/217 |
| 2010/0281005 A1* | 11/2010 | Carlin | G06F 17/30312 |
| | | | 707/696 |
| 2011/0252000 A1* | 10/2011 | Diaconu | G06F 17/30501 |
| | | | 707/638 |
| 2012/0151495 A1 | 6/2012 | Burckhardt et al. | |
| 2013/0110883 A1* | 5/2013 | Junqueira | G06F 17/30359 |
| | | | 707/803 |
| 2013/0179395 A1 | 7/2013 | Herman et al. | |
| 2013/0325901 A1* | 12/2013 | Barber | G06F 16/278 |
| | | | 707/792 |
| 2014/0085115 A1* | 3/2014 | Beier | H03M 7/30 |
| | | | 341/106 |
| 2014/0172804 A1* | 6/2014 | Kaufmann | G06F 17/30321 |
| | | | 707/649 |
| 2014/0351535 A1 | 11/2014 | Santry | |
| 2015/0363468 A1* | 12/2015 | Alvey | G06F 17/30315 |
| | | | 707/769 |

OTHER PUBLICATIONS

Gupta, A. et al., "Mesa: Geo-Replicated, Near Real-Time, Scalable Data Warehousing", Proceedings of the 40th International Conference on Very Large Data Bases (VLDB Endowment), Sep. 1-5, 2014, pp. 1259-1270, vol. 7, No. 12, China.

Plattner, H., "The Impact of Columnar In-Memory Databases on Enterprise Systems", Proceedings of the 40th International Conference on Very Large Data Bases (VLBD Endowment), Sep. 1-5, 2014, pp. 1722-1729, vol. 7, No. 13, China.

Mell, P., et al., "The NIST Definition of Cloud Computing", National Institute of Standards and Technology Special Publication 800-145, Sep. 2011, pp. 1-7, U.S. Department of Commerce, United States.

List of IBM patents or patent applications treated as related: Barber, R.J., U.S. Appl. No. 16/555,721, Filed: Aug. 29, 2019.

* cited by examiner

IN-PLACE UPDATES WITH CONCURRENT READS IN A DECOMPOSED STATE

BACKGROUND

Embodiments of the invention relate to data structure processing, in particular, for data structure processing for in-place updates with concurrent reads in a decomposed store for consistency of data.

There is an increasing trend towards doing business intelligence (BI) queries on real-time data in databases or tabled data. Traditionally, there is a strict separation between BI systems and online transaction processing (OLTP) systems. There is increasing market pressure for operational BI, and for both transactions and analytics to be performed on the same database or other forms of multithreaded applications.

In BI, analytics are performed on the same data where updates are happening. Conventionally, a big challenge with this is contention, between reads (queries) and updates. To avoid this contention traditionally, analytics are performed on a separate system from the updates, but this means the analytics ares always somewhat out of date. This contention problem has become worse in recent years, because data format has switched to column stores. Each object (record) is stored in a decomposed fashion, with different parts on different pages. To deal with the contention, readers and updaters have to simultaneously latch the entire record—either all pages, or other record-level enclosures (e.g., record id ranges). Without this latch, the updater updates a record in decomposed fashion, and the reader potentially sees an inconsistent version of the record. With the latch, readers have to pay for an expensive latch per record overhead, which is especially problematic for BI queries that often scan large portions of the entire data set. Updaters have to wait for all the readers to 'drain out' before they can access a record.

SUMMARY

Embodiments of the invention relate to data structure processing for in-place updates with concurrent reads in a decomposed store for consistency of data. One embodiment presented is a method that includes setting, by an update processor, a write latch in a first data structure associated with an object. The update processor copies the first data structure to a storage structure. The update processor sets a history tuple sequence number (TSN) of the first data structure to point to a TSN of the copied first data structure. The update processor sets the version identifier of the first data structure to point to a transaction identification for the object, and unsets the write latch. The update processor updates one or more data portions of the first data structure. A reader processor reads the version identifier from the first data structure, and determines whether the version identifier of the first data structure is visible to the reader processor. Upon the version identifier of the first data structure being visible to the reader processor, the reader processor accesses the first data structure and determines whether the version identifier of the first data structure changed since starting the access.

These and other features, aspects and advantages of the present invention will become understood with reference to the following description, appended claims and accompanying figures.

DETAILED DESCRIPTION

Figure 1:
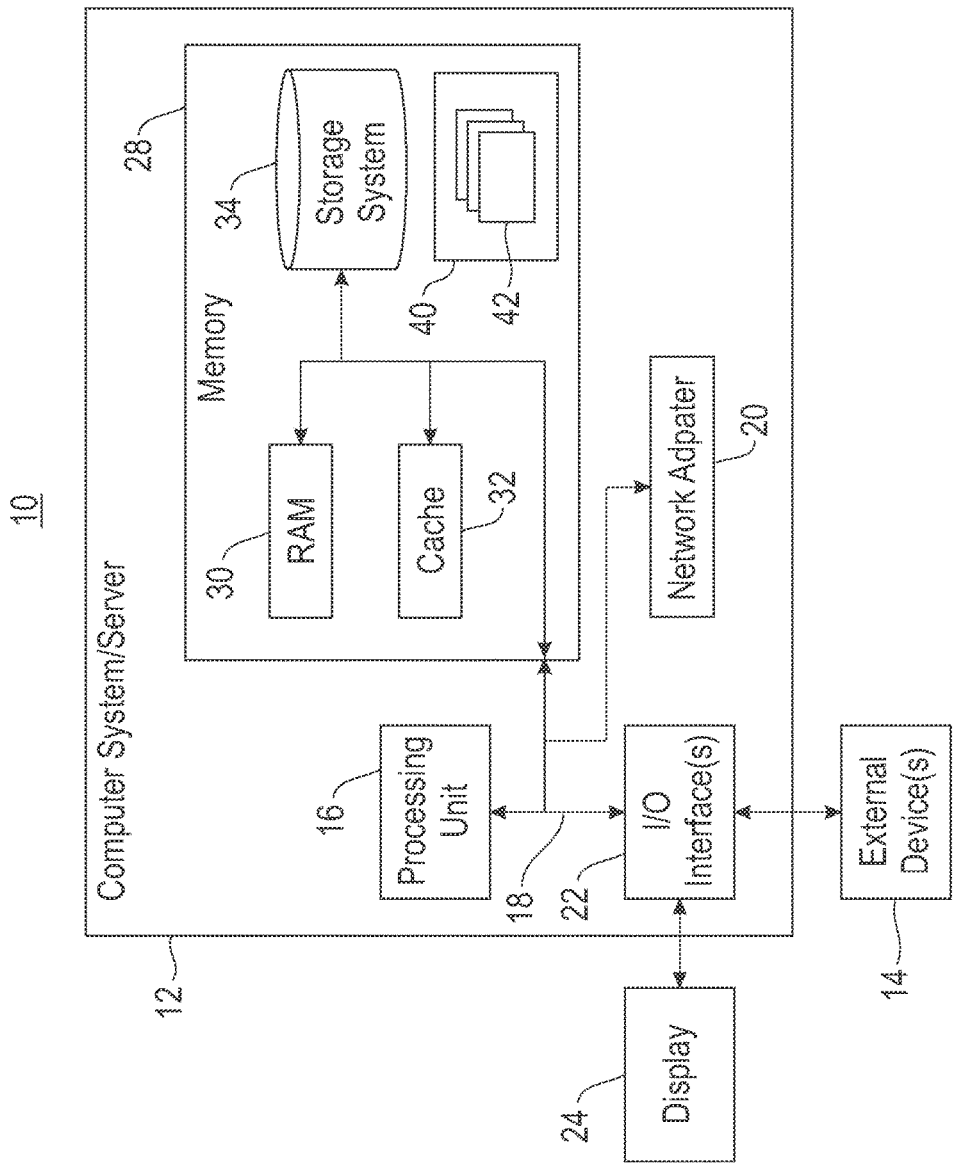
FIG. 1 depicts a cloud computing node, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
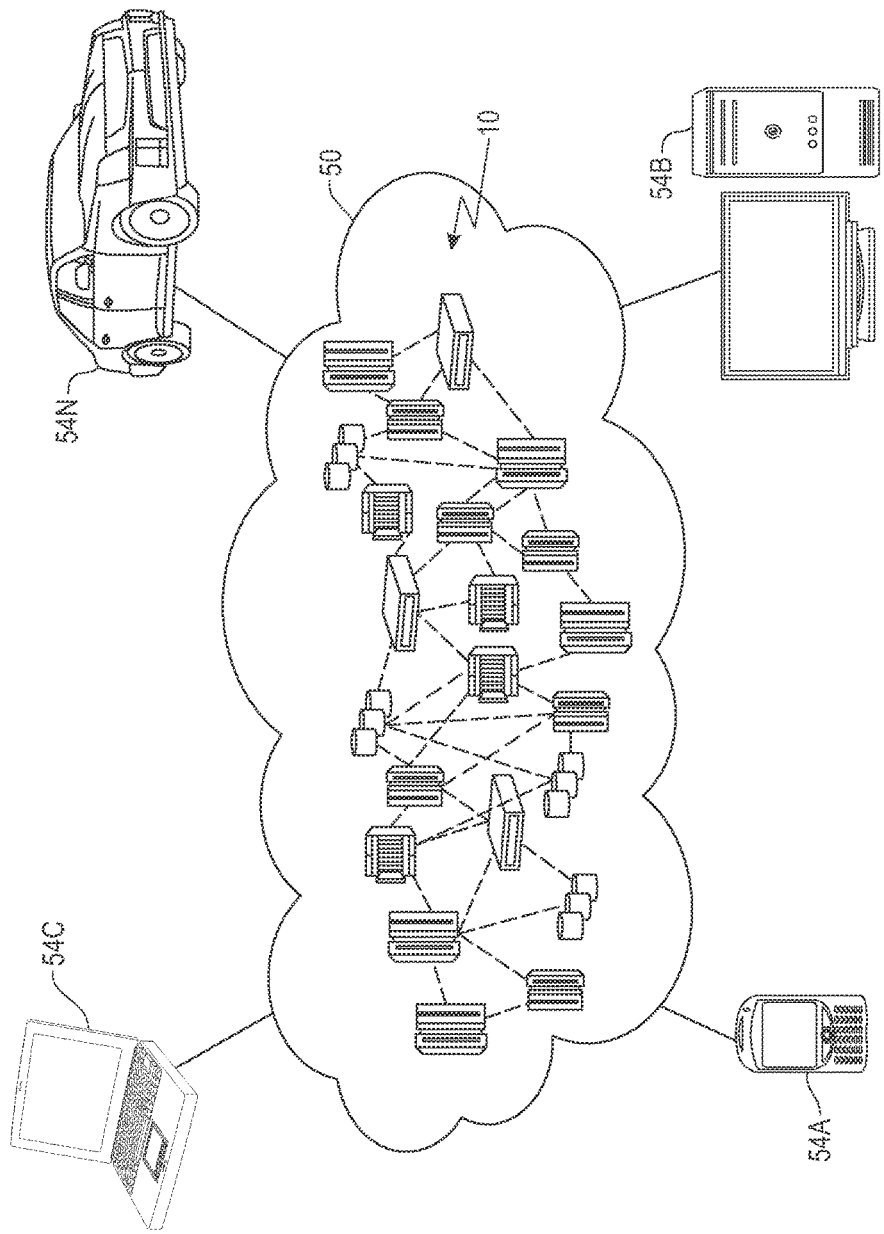
FIG. 2 depicts a cloud computing environment, according to an embodiment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
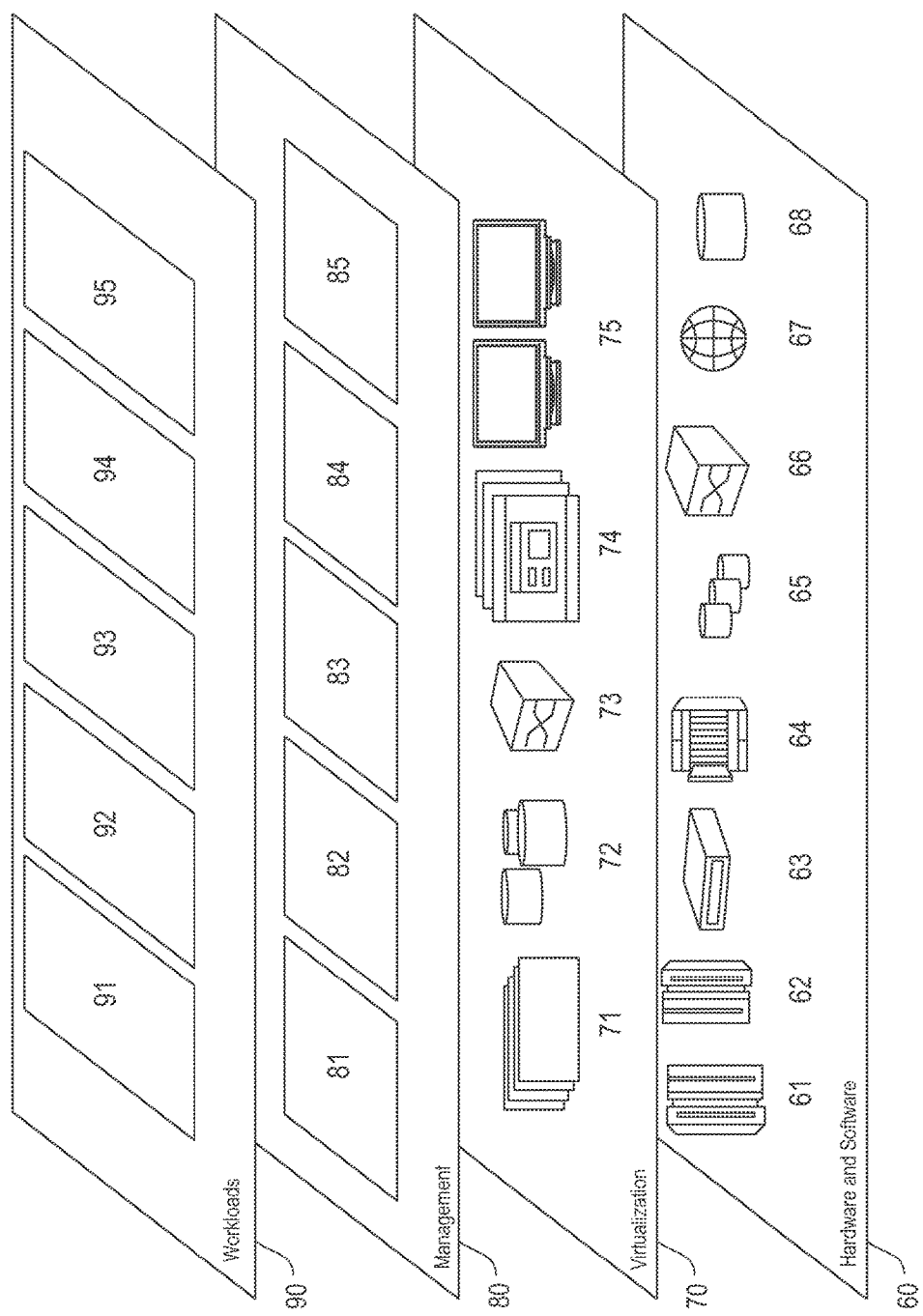
FIG. 3 depicts a set of abstraction model layers, according to an embodiment.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 3 are illustrative only, and the invention is not limited to these examples.

It is understood all functions of one or more embodiments as described herein may be typically performed by the server 12 (FIG. 4), which can be tangibly embodied as modules of program code 42 of program/utility 40 (FIG. 1). However, this need not be the case. Rather, the functionality recited herein could be carried out/implemented and/or enabled by any of the layers 60, 70, 80 and 90 shown in FIG. 3.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Embodiments of the invention relate to data structure processing for in-place updates with concurrent reads in a decomposed store for consistency of data. One embodiment provides a method that includes setting a write latch of a first data structure associated with an object. In one embodiment, the method includes an update processor copying the first data structure to a storage structure. The update processor sets a history tuple sequence number (TSN) of the first data structure to point to a TSN of the copied first data structure. It should be noted that a set of tuple sequence numbers (TSNs) are also referred to as a tuple or row identifier. The update processor sets the version identifier of the first data structure to point to a transaction identification for the object, and unsets the write latch. The update processor updates one or more data portions of the first data structure. A reader processor reads the version identifier from the first data structure, and determines whether the version identifier of the first data structure is visible to the reader processor. Upon the version identifier of the first data structure being visible to the reader processor, the reader processor accesses the first data structure and determines whether the version identifier of the first data structure changed since starting the access. One or more embodiments relate to database transactions and for multithreaded applications where composite objects are updated and accessed by multiple threads at the same or near simultaneous times.

Column stores common—objects that are stored decomposed (logically one record, but stored in separate pages). There are other use cases also for decomposed stores. A challenge is that updaters change an entire object, which is spread out. Therefore, a problem to solve is how to show readers a consistent version of the object. Conventionally, read-latching the object (e.g., latch all pages over which the object is spread out), such as latch an enclosure of a logical object (e.g., a TSN range). The drawback results in reduced concurrency, increased latching cost for readers, and writers have to drain out readers. In one embodiment, a column version create time identifier (vctid) is designated. In one embodiment, the vctid starts out as an identifier of the updater, and after the updater commits, the vctid is replaced with this commit timestamp. In one embodiment, the updater updates the vctid first before changing object content. In one embodiment, a reader reads the vctid first, and rechecks it after reading content to verify that they read a consistent version. In one example embodiment, page-level last update timestamps are used to avoid rechecking for not-recently-updated pages. In one or more embodiments, the readers see a committed version of an entire object, without any read latches.

Figure 4:
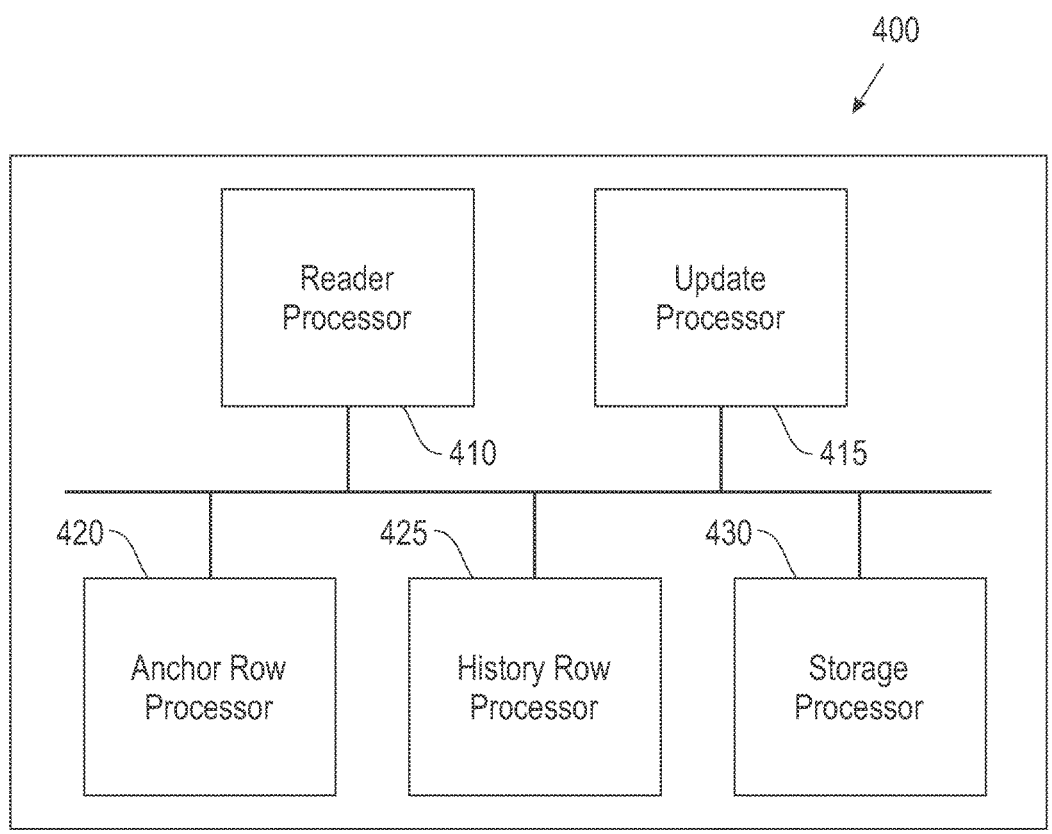
FIG. 4 is a block diagram illustrating a system for data structure processing including in-place updates with concurrent reads in a decomposed store for consistency of data, according to an embodiment.

FIG. 4 is a block diagram illustrating a system 400 for data structure processing for in-place updates with concurrent reads in a decomposed store for consistency of data, according to an embodiment. In one embodiment, the system 400 includes a reader processor 410, an updater processor 415, an anchor row processor 420, a history row processor 425 and a storage device and/or storage processing 430. In one embodiment, the system may be embedded in a server or other computing device, or separate devices. In one embodiment, the storage device and/or storage processing 430 may store objects, such as rows/columns/individual values, tables, etc. In a relational database, a table (or file) organizes the information about a single topic into rows and columns. In one embodiment, the storage device and/or storage processing 430 may include different types of memory storage, such as a buffer pool, cloud based storage, different types of objects pools, etc., and may be internal, external or a combination of internal and external to the other processing devices.

Figure 10:
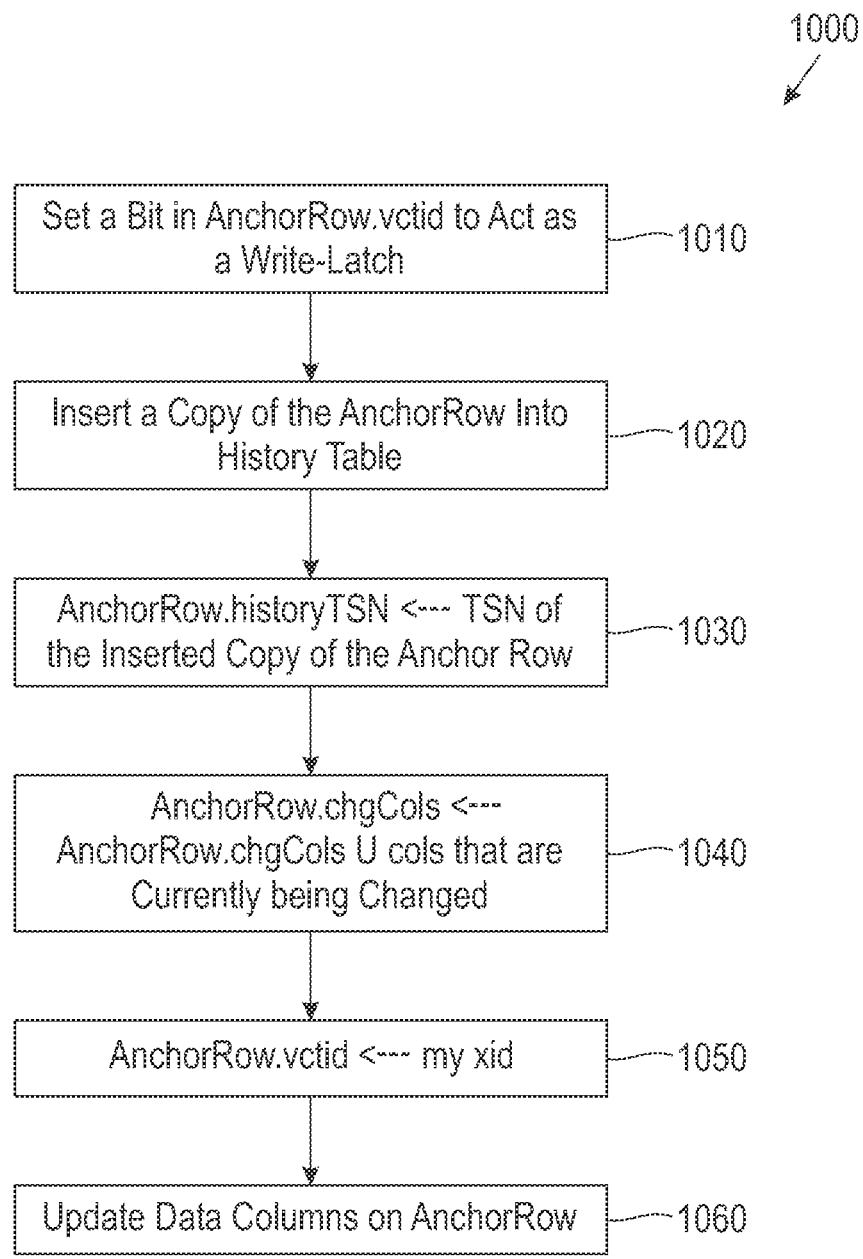
FIG. 10 illustrates a process for an updater protocol for selective-object history, according to an embodiment.
Figure 11:
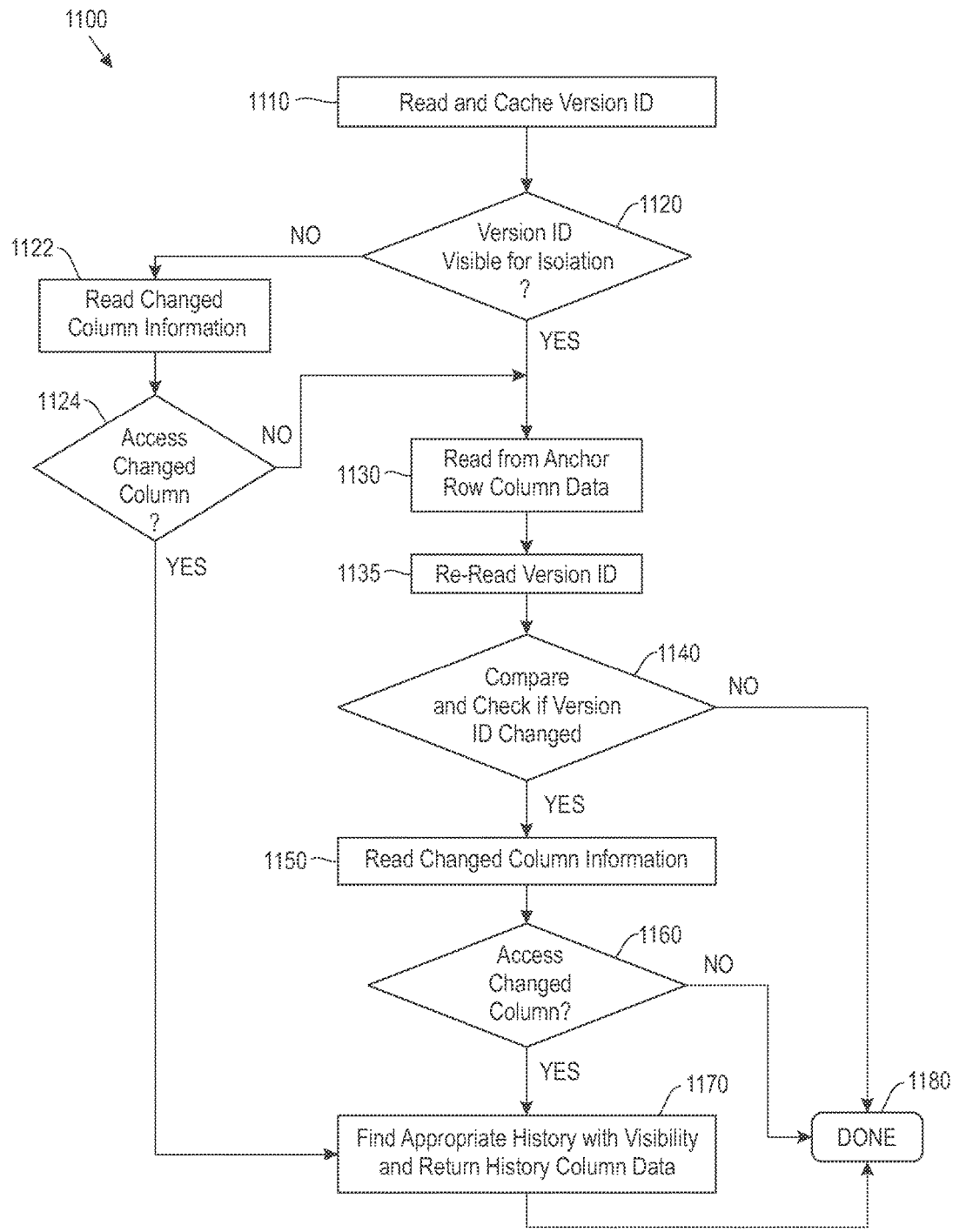
FIG. 11 illustrates a process for a reader protocol for selective-object history, according to an embodiment.

In one embodiment, the reader processor 410 and updater processor 415 perform processing objects and data structures. In one embodiment, the reader processor performs processes and operations for readers (see, e.g., reader protocols 800 (FIG. 8) and 1100 (FIG. 11). In one embodiment, the updater processor performs processes and operations for updaters (see, e.g., updater protocols 700 (FIG. 7) and 1000 (FIG. 10). In one embodiment, the anchor row processor 420 provides processing for anchor row data structures and their elements (see, e.g., anchor row data structure format 500, FIG. 5). In one embodiment, the history row processor 425 provides processing for history row data structures and their elements (see, e.g., history row data structure format 600, FIG. 6).

In one embodiment, the need for consistency is decided by the application performing accesses to the object data. In one example, three types of consistency may easily be provided by system 400 and others may be obtained as well with more tracking. In one example embodiment, "Snapshot Isolation" is provided. This technique guarantees the application sees a view of the objects as they existed when a transaction started. In one example, snapshot isolation is performed by recording a time of a transaction start along with a position into a modification transaction outcome log, such that transactions that were committed prior to the transaction start are known, and what time to watch for clearly visible changes is also known. In addition an optimization may be performed to record the minimum uncommitted (i.e., in-flight) transaction identification/identifier (ID) at the start time as well.

In one embodiment, a less strict isolation is an uncommitted read, which allows a transaction to see changes made by other modification transactions that have not yet committed (and may even fail). With this isolation, it is still generally guaranteed that a consistent version of a single object is seen, no matter how many fields are examined. This means the system 400 records the available version of the set of objects currently being accessed, and then uses that version ID to guarantee consistency as other fields of these objects are accessed.

In one embodiment, an option between currently committed would provide more current and accurate data with an inconsistent world-view. Here capturing a start time of the transaction would not be relied on. Instead, a per-object access capture a time/transaction state is relied on, such that access to all fields within the object are of a consistent version and the latest committed version at time of first field access. This has properties of seeing the latest "good" version of an object, with the costs of tracking a per-object version for read transactions and inconsistency in the case of reading multiple objects that were originally updated by a single transaction that committed during the time of the running read transaction.

In one embodiment, the tracking of updates may be done simply by recording the entire object when any field changes, as would be the case if generally most fields change together, or the burden of recording the entire object is not significant. Alternatively, in one embodiment a scheme to track which parts of objects were changed, and thus, only require recording historical versions of a subset of the object. For simplicity and efficiency of retrieval, in the case of multiple updates to an object, the historical changes are cumulative for an object.

In one embodiment, the object creation timestamp must also be recorded in the anchor row 500 (FIG. 5) data structure when selective history is recorded as it is required to know if the object is visible to the read transaction, which may be accessing a field that had not been modified. Note in the case of updated fields, the access finds a version of history containing the latest visible version or determines the object that was never visible for this transaction and skip it. The term "Row" is the containment of the various fields of the object, including meta-fields not part of the base object data.

Figure 5:
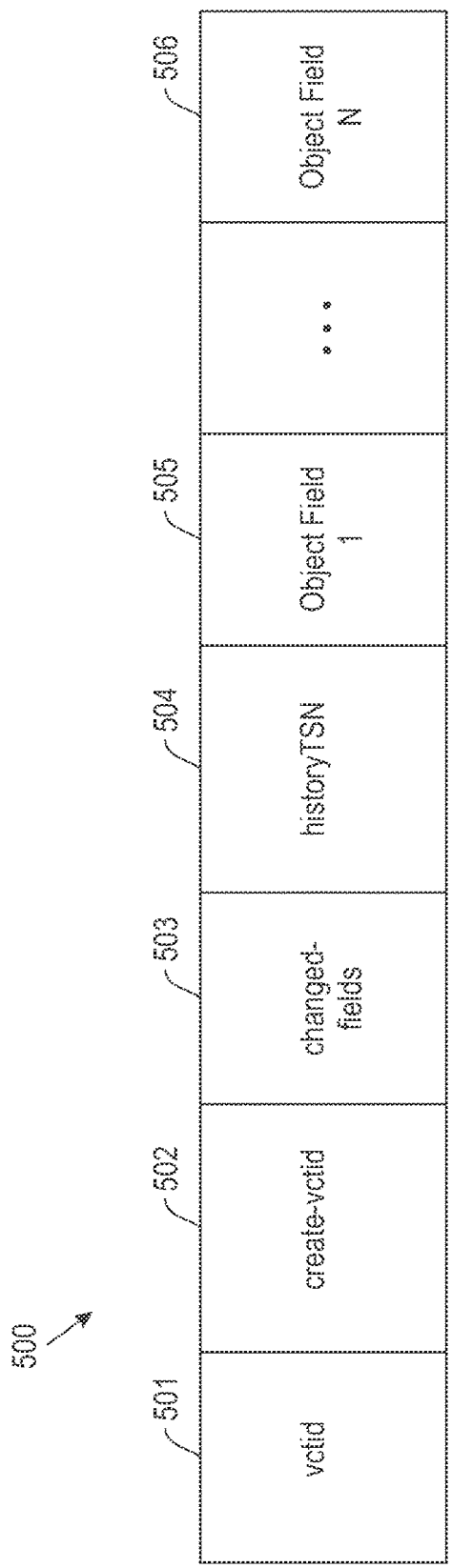
FIG. 5 illustrates format for an anchor row data structure, according to one embodiment.

FIG. 5 illustrates format for an anchor row (or AnchorRow) data structure 500, according to one embodiment. In one embodiment, the anchor row data structure 500 includes a vctid field 501. The vctid field is the version identification of the anchor row 500. In one embodiment, the vctid 501 comprises a transaction ID for a recently updated row, and may optionally be changed to a timestamp for committed transaction's change. These two types of values may be stored in a single field by use of a bit from the field to identify the value "type" as being a transaction ID or timestamp. In one example embodiment, the behavior of transaction IDs is generally a non-repeating sequence; however some additional optimizations are possible if the vctid 501 is deployed as an increasing (or decreasing) non-repeating sequence. In one embodiment, the create-vctid 502 field (used with selective-object history) is a version identification of creation of the object. Similar as with the vctid 501, the create-vctid 502 field may be converted to a timestamp after the transaction has committed. In one embodiment, the changed data field 503 (used with selective-object history) comprises a bitmap structure or code that may be examined with a dictionary to know the changed fields available in history. The history TSN filed 504 includes a pointer to the latest history recording of the object if an update exists, otherwise the history TSN field 504 is empty. The object fields 1-n 505-506 hold data for the objects.

Figure 6:
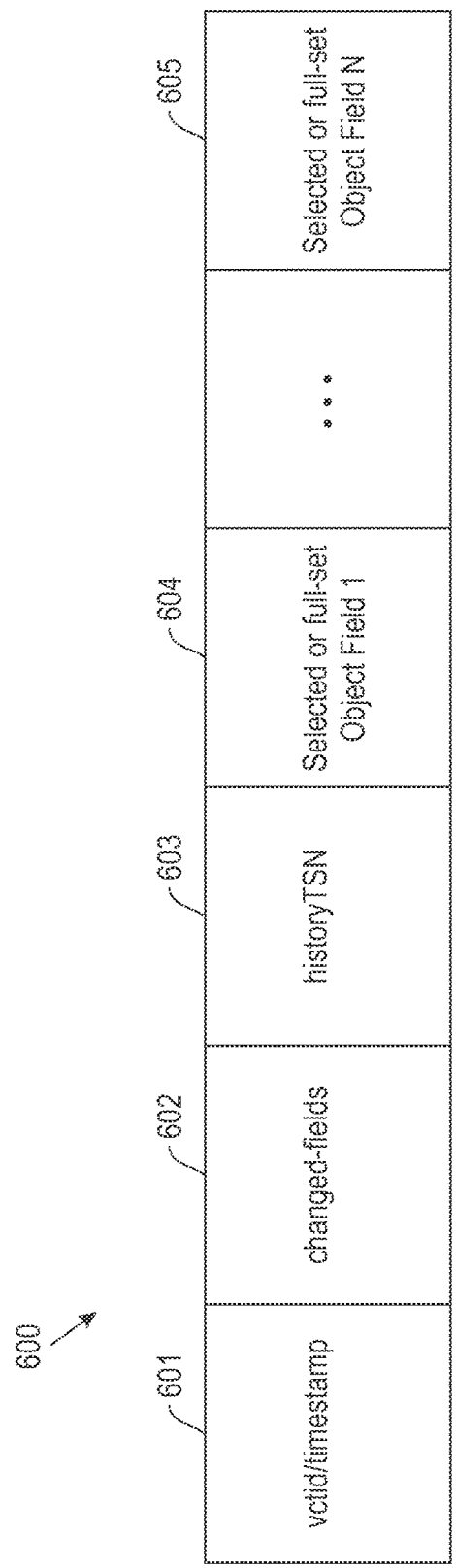
FIG. 6 illustrates format for a history row data structure, according to one embodiment.

FIG. 6 illustrates format for a history row (or HistoryRow) data structure 600, according to one embodiment. In one embodiment, the history row data structure 600 includes all fields copied from the anchor row data structure 500 (FIG. 5) prior to any alteration of an update transaction with only a possible exception of the vctid field 501, which may be translated from a transaction ID to a timestamp. In one example, this history may be thought of as append-only, as no updates are made to past history rows. In one embodiment, the vctid field 601 is the version identification. In one embodiment, the vctid field 601 may optionally be changed to a timestamp as all historic entries have been committed (because in one embodiment altering of uncommitted objects is disallowed). Changed fields 602 (used with selective-object history) include a bitmap structure or code that may be examined with a dictionary to know the changed fields available in history. The history TSN field 603 is a pointer to the next latest history recording of the object if an update exists, otherwise this field would be empty. Selected or full set of object fields 1-N 604-605 include object data.

Figure 7:
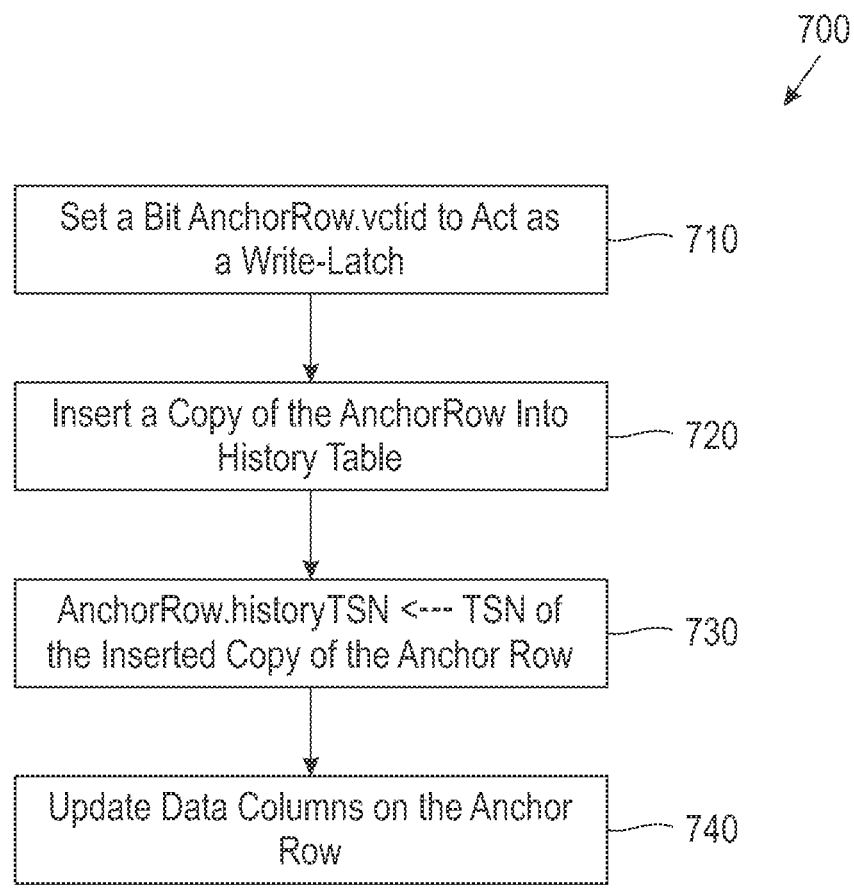
FIG. 7 illustrates a process for an updater protocol for full-object history, according to an embodiment.

FIG. 7 illustrates a process 700 for an updater protocol for full-object history, according to an embodiment. In one embodiment, in block 710 a bit is set in the anchor row 500 vctid field 501 (AnchorRow.vctid) (FIG. 5) to act as a write-latch: concurrent writers that encounter this will roll back to accessing a prior version (or the concurrent writers may also wait in an alternative embodiment). It should be noted that concurrent readers ignore this latch—the concurrent writers may continue to access the anchor row 500. In one example, there is no logging to storage for this process block. In one embodiment, in block 720 a copy of the anchor row 500 is inserted into a history table or storage structure (e.g., by storage processing 430 (FIG. 4)). In one embodiment, the copy includes all the fields of the original object, plus the vctid field 501, and the history TSN field 504. In one example, in process block 720 the re-do is logged, and is not undone. In one embodiment, in block 730 the anchor Row 500 history TSN 504 is set to point to the TSN of the inserted copy (AnchorRow.historyTSN<- - -TSN of the inserted copy). The redo is logged, and is not undone.

In one embodiment, after block 730 the anchor row 500 vctid field 501 is set to a pointer of a transaction identification for the object (AnchorRow.vctid<- - -my xid) (in the process, unsetting the write latch bit that was set in block 710. In one example, at this point the anchor row 500 becomes off-limits to concurrent readers (e.g., concurrent readers do not wait—and proceed to the history for changed fields). The data is redo-undo logged. In one embodiment, in block 740 data columns on the anchor row 500 are updated. At this point, a redo-undo logged occurs.

Figure 8:
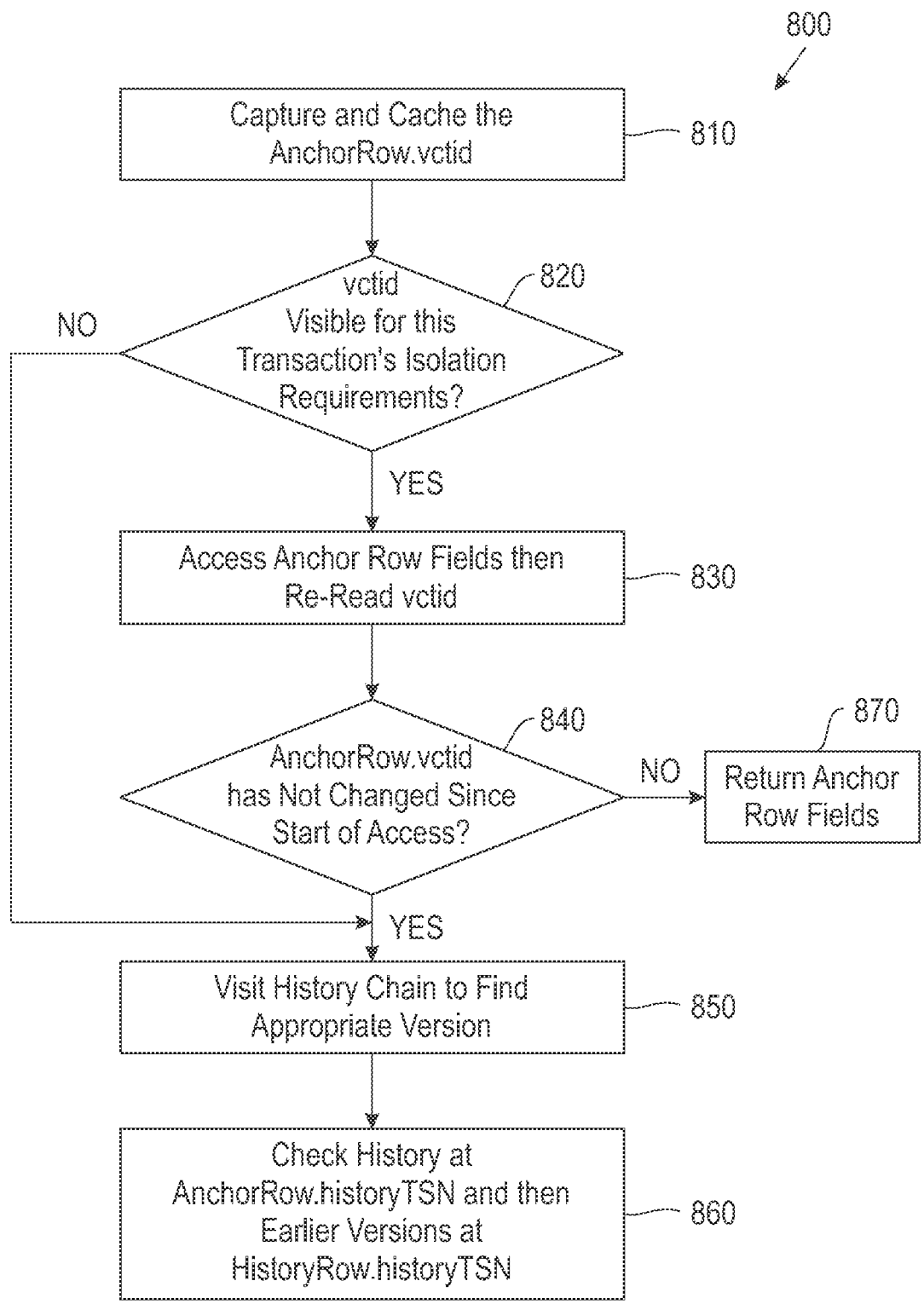
FIG. 8 illustrates a process for a reader protocol for full-object history, according to an embodiment.

FIG. 8 illustrates a process 800 for a reader protocol for full-object history, according to an embodiment. In block 810 the anchor row 500 vctid 501 (anchorRow.vctid) is captured and cached. In block 820 it is determined if the vctid 501 is visible for the transaction's isolation requirements. If it is determined that the vctid is visible, then process 800 proceeds to block 830, otherwise process 800 proceeds to block 850. In one embodiment, in block 830 anchor row fields 500 are accessed, then re-read. In block 840 it is determined if the anchor row 500 vctid 501 (anchorRow.vctid) has not changed (with no respect of the latch bit) since the start of the access. If it is determined that there is no change then process 800 proceeds to block 870 where the read anchor row fields are returned, otherwise process 800 proceeds to block 850. In block 850 the history chain is traversed to find an appropriate version.

In one embodiment, in block 860 the history at the anchor row 500 history TSN 504 (AnchorRow.historyTSN) is checked, and then earlier versions at the history row 600 history TSN 603 (HistoryRow.historyTSN) are checked.

Figure 9:
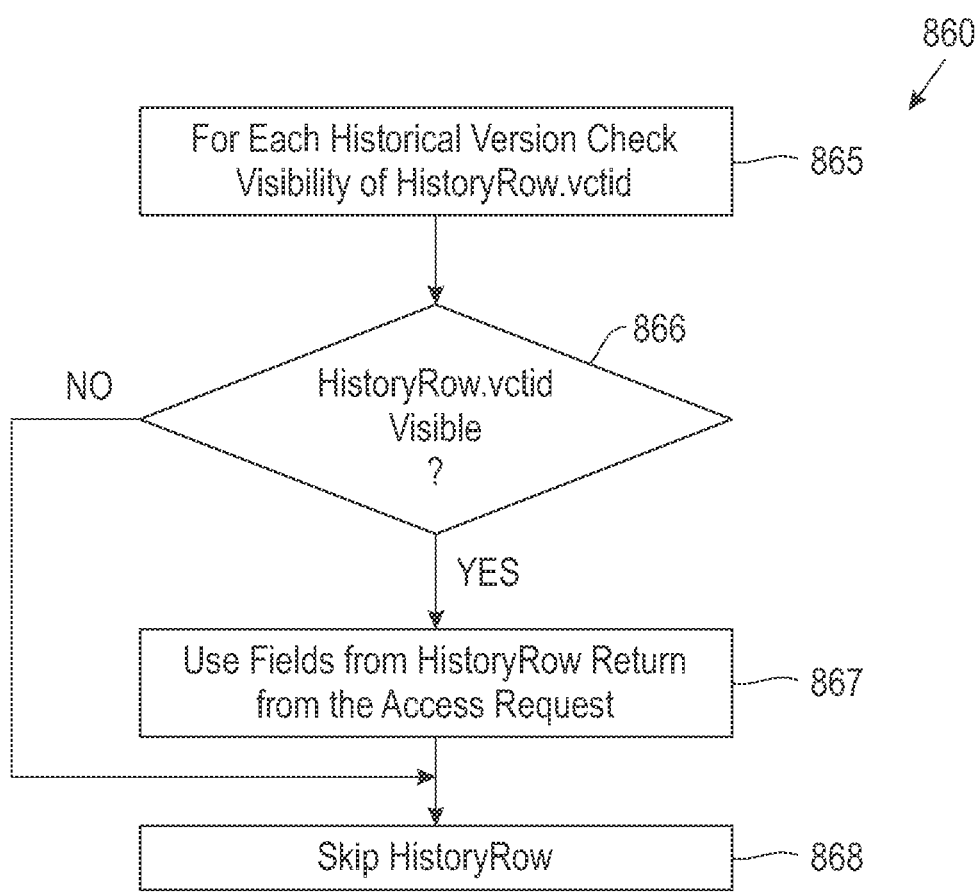
FIG. 9 illustrates a process for check history of the process shown in FIG. 8, according to one embodiment.

FIG. 9 illustrates a process for check history block 860 of the process shown in FIG. 8, according to one embodiment. In one embodiment, in block 865 for each historical version the visibility of the history row 600 vctid 601 (HistoryRow.vctid) is checked. In block 866 it is determined if the vctid 601 is visible. If the vctid 601 is visible, in block 867 the object fields 1-N 604-605 from the history row 600 are used and returned from the access request. Otherwise, if no visible vctid 601 is found, in block 868 the history row 600 history TSN 603 (HistoryRow.historyTSN) is empty and the row is skipped as it is "too new" and not visible to the read transaction.

In one embodiment, optimizations may be employed for the updater and reader protocols. In one embodiment, optimization is used to avoid re-reading and re-checking the vctid. It is common for updaters to associate a timestamp with each update (e.g., a log sequence number (LSN) of a log entry for that update), and to associate updated pages with the timestamp of the last update on that page (commonly referred to as pageLSN). In one embodiment, updaters set the pageLSN before doing updates. In one embodiment, reader records current value from this sequence before the first read of the vctid. For example, if the vctid value is 10:05 am, any update to an object that starts after this read must have a timestamp>=10:05 am. In one embodiment, after reading each object value, the reader reads the pageLSN. For example, if this value is 10 am, the reader has not seen any updates on this page for updates with timestamp after 10 am. If the pageLSN<recorded value, there is no need to re-read vctids (i.e., skip blocks 830-860 of process 800).

In one embodiment, an optimization is added to avoid reading the vctid once per object. An important class of readers are BI queries, which scan through large numbers of objects. These readers apply the same reader protocol as before (e.g., process 800), except that in each block, they operate on a range of objects.

FIG. 10 illustrates a process 1000 for an updater protocol for selective-object history, according to an embodiment. In one embodiment, in block 1010 a bit is set in the anchor row 500 vctid field 501 (AnchorRow.vctid) (FIG. 5) to act as a write-latch: concurrent writers that encounter this will roll back to accessing a prior version (or the concurrent writers may also wait in an alternative embodiment). It should be noted that concurrent readers ignore this latch—the concurrent writers may continue to access the anchor row 500. In one example, there is no logging to storage for this process block. In one embodiment, in block 1020 a copy of the anchor row 500 is inserted into the history table or storage structure (e.g., by storage processing 430 (FIG. 4)). In one embodiment, the copy includes the updated columns, in a cumulative sense, plus the vctid field 501, the history TSN field 504 and the changed column fields (changedCols) of the changed fields 503 of the anchor row 500. In one example, in process block 1020 the re-do is logged, and is not undone. In one embodiment, in block 1030 the anchor Row 500 history TSN 504 is set to point to the TSN of the inserted copy (AnchorRow.historyTSN<- - -TSN of the inserted copy). The redo is logged, and is not undone. In block 1040, the changed columns of the anchor row 500 are set to point to the anchor row 500 updated changed columns (AnchorRow.chgCols<- -anchorRow.chgCols Ucols) that are currently being changed. The re-do is logged.

In one embodiment, in block 1050 the anchor row 500 vctid field 501 is set to a pointer of a transaction identification for the object (AnchorRow.vctid<- - -my xid) (in the process, unsetting the write latch bit that was set in block 1010). In one example, at this point the anchor row 500 becomes off-limits to concurrent readers (e.g., concurrent readers do not wait and proceed to the history for changed fields). The data is redo-undo logged. In one embodiment, in block 1060 data columns on the anchor row 500 are updated. At this point, a redo-undo logged occurs.

FIG. 11 illustrates a process 1100 for a reader protocol for selective-object history, according to an embodiment. In one embodiment, in block 1110 the version ID (e.g., anchor row 500 vctid 501 (anchorRow.vctid)) is read and cached. In block 1120 it is determined if the version ID is visible for isolation requirements. If it is determined that the version ID is visible, then process 1100 proceeds to block 1130, otherwise process 1100 proceeds to block 1122. In one embodiment, in block 1130 anchor row column data is read. In block 1135, the version ID is re-read. In block 1140 it is determined if the version ID has changed by performing a compare (with no respect of the latch bit). If it is determined that there is no change then process 1100 proceeds to block 1180, otherwise process 1100 proceeds to block 1150. In block 1150, the changed column information (e.g., anchor row 500 changed fields 503 (FIG. 5) (AnchorRow.changedFields)) are fetched/read. In block 1160 it is determined if an access column was previously changed. If an accessing changed column changed, then process 1100 proceeds to block 1170, otherwise process 1100 completes. In block 1122 changed column information is read and process 1100 proceeds to block 1124. In block 1124, it is determined if an accessed column had previously changed. If an accessed column had changed, process 1100 proceeds to block 1170, otherwise process 1100 proceeds to block 1130.

Figure 12:
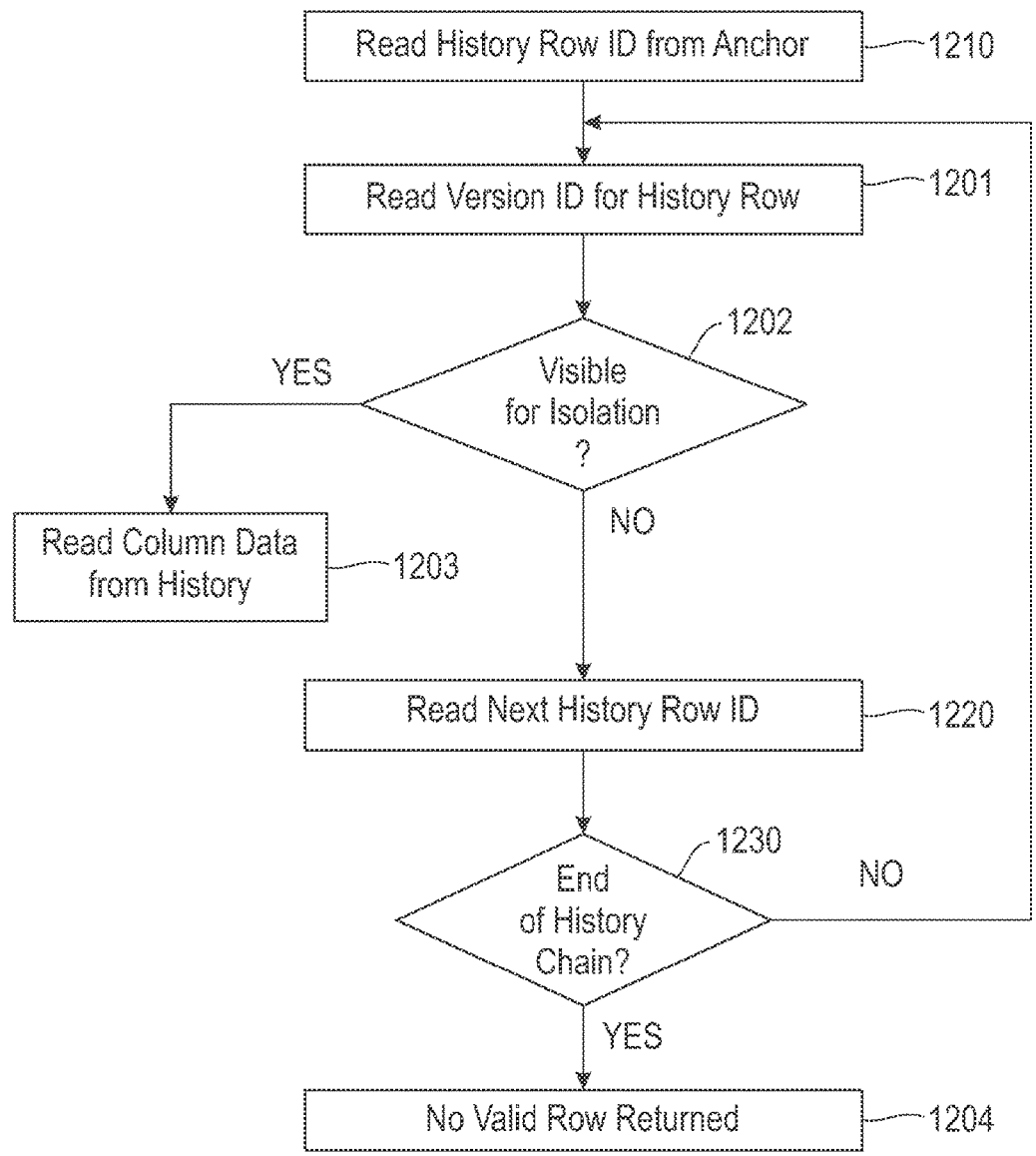
FIG. 12 illustrates a process for check history that may be implemented with the process shown in FIG. 11, according to one embodiment.

FIG. 12 illustrates a process for check history that may be implemented with process 1100 shown in FIG. 11, according to one embodiment. In one embodiment, in block 1210 the history row identifier is read from the anchor (e.g., AnchorRow). In block 1201 the version ID is read for the history row. In block 1202 it is determined whether the vctid 601 is visible. If the vctid 601 is visible, in block 1203 the column data is read from history (e.g., history row 600). Otherwise, if no visibility, in block 1220 the next history row is read. In block 1230, it is determined if this was the last history record. In block 1204 no valid row is returned (e.g., the history row 600 history TSN 603 (HistoryRow.historyTSN) is empty and the row is skipped as it is "too new" and not visible to the read transaction).

Figure 13:
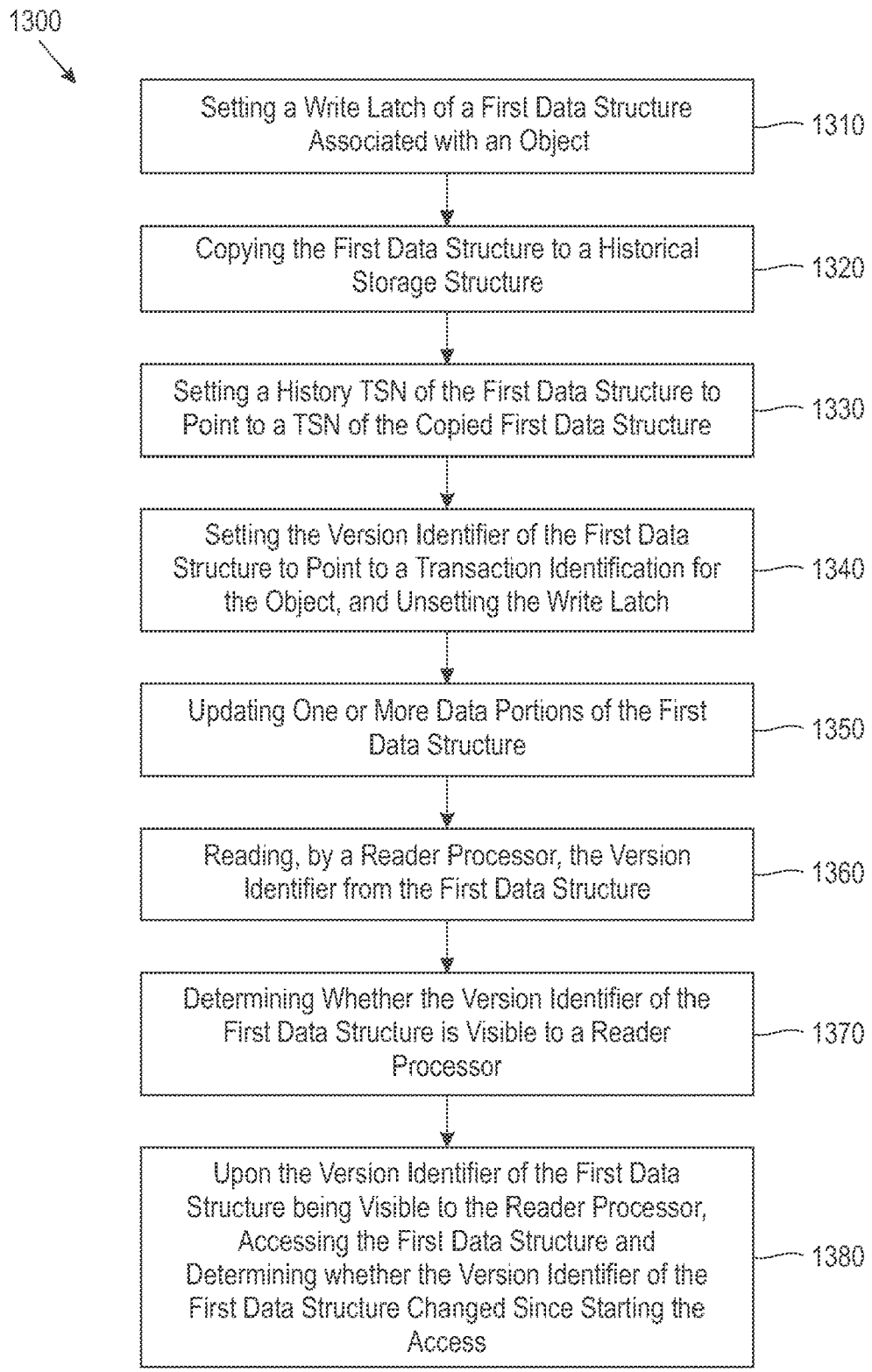
FIG. 13 is a block diagram of a process for data structure processing including in-place updates with concurrent reads in a decomposed store for consistency of data, according to an embodiment.

FIG. 13 is a block diagram of a process 1300 for data structure processing including in-place updates with concurrent reads in a decomposed store for consistency of data, according to an embodiment. In one embodiment, in block 1310, process 1300 sets a write latch of a first data structure (e.g., anchor row 500) associated with an object. In one embodiment, the write latch may be a portion of a version identifier (e.g., vctid 501, FIG. 5) of a first data structure (e.g., anchor row 500) associated with an object. In one embodiment, in block 1320 process 1300 copies by an updater or update/updater processor (e.g., by updater/update processor 415, FIG. 4), the first data structure to a storage structure (e.g., by storage processing 430). In block 1330 process 1300 sets by the updater or updater processor (e.g., by the updater processor 415), a history TSN 504 of the first data structure to point to a TSN of the copied first data structure. In block 1340, the updater or updater processor sets the version identifier of the first data structure to point to a transaction identification for the object (e.g., AnchorRow.vctid<- - -my xid), and unsets the write latch portion.

In one embodiment, in block 1350 the updater or updater processor updates one or more data portions (e.g., object fields 1-N 505-506, FIG. 5) of the first data structure. In one embodiment, in block 1360 process 1300 reads, by a reader or reader processor (e.g., reader processor 410), the version identifier from the first data structure. In block 1370 the reader or reader processor determines whether the version identifier of the first data structure is visible to the reader processor (e.g., based on isolation requirements). In one embodiment, in block 1380 upon the version identifier of the first data structure being visible to the reader processor, the reader or reader processor accesses the first data structure and determines whether the version identifier of the first data structure changed since starting the access.

In one embodiment, process 1330 further includes upon the version identifier of the first data structure not being visible to the reader processor, performing a historical version check of the first data structure history TSN and then at previous versions of the history TSN of a second data structure (e.g., history row 600), and for each historical version, checking visibility of a version identifier (e.g., vctid 601) of the second data structure and returning one or more data portions of the second data structure from an access request transaction upon the version identifier of the second data structure being visible.

In one embodiment, process 1300 may further include that for selected history for the object, setting, by the updater or updater processor, a changed data indicator of the first data structure to point to updated changed data portions of the first data structure. In one embodiment, for selected history for the object, process 1300 may further include reading, by a reader or reader processor, the changed data portions of the first data structure; and if an access field is marked as changed data, then for each historical version, checking visibility of a version identifier of the second data structure and returning one or more data portions of the second data structure from an access request transaction upon the version identifier of the second data structure being visible; otherwise reading a create-version identifier field from the first data structure and verify the version identifier of the first data structure is visible to the reader process or processor and perform the accessing; otherwise skip reading the first data structure.

In one embodiment, in process 1300 object access consistency may include a snapshot isolation view of objects, an uncommitted read that provides a transaction to view changes made by other modification transaction that are uncommitted, or a currently committed read based on a per-object access that captures a time or transaction state. In one embodiment, in process 1300 concurrent writers to the object that encounter a set write latch portion roll back to accessing a prior version of the object, and concurrent readers of the object ignore the write latch portion setting.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    setting, by an update processor, a write latch in a first data structure associated with an object, wherein the first data structure comprises one or more changed data indicator fields;
    copying, by the update processor, the first data structure to a storage structure;
    setting, by the update processor, a history tuple sequence number (TSN) of the first data structure to point to a TSN of the copied first data structure;
    setting, by the update processor, the version identifier of the first data structure to point to a transaction identification for the object, and unsetting the write latch;
    updating, by the update processor, one or more data portions of the first data structure;
    reading, by a reader processor, the version identifier from the first data structure;
    determining, by the reader processor, whether the version identifier of the first data structure is visible to the reader processor;
    upon the version identifier of the first data structure being visible to the reader processor, accessing, by the reader processor, the first data structure and determining whether the version identifier of the first data structure changed since starting the access;
    examining information in the one or more changed data indicator fields using a dictionary to determine changed data fields available in a history table;
    upon the version identifier of the first data structure not being visible to the reader processor, performing a historical version check of the first data structure's history TSN and then at previous versions of the history TSN of a second data structure; and
    for each historical version, checking visibility of a version identifier of the second data structure and returning one or more data portions of the second data structure from an access request transaction upon the version identifier of the second data structure being visible.

2. The method of claim 1, further comprising:
    for selected history for the object, setting, by the update processor, a changed data indicator of the first data structure to point to updated data portions of the first data structure.

3. The method of claim 2, further comprising:
    for selected history for the object, reading the changed data portion of the first data structure and if an accessed field is marked as changed data, then for each historical version, checking visibility of a version identifier of the second data structure and returning one or more data portions of the second data structure from an access request transaction upon the version identifier of the second data structure being visible, otherwise reading a create-version identifier field from the first data structure and verifying that the create-version identifier of the first data structure is visible to the reader processor and perform the accessing, otherwise skip reading the first data structure.

4. The method of claim 1, wherein the first data structure comprises:
    a version identifier field that is convertible to a time stamp field after the transaction is committed,
    a create version identifier field that is convertible to a time stamp field after the transaction has committed,
    a history TSN field that includes a pointer to a next latest history recording of the object if an update exists or is empty, and
    a plurality of object fields,
wherein the information of the one or more changed data indicator fields includes a bitmap structure or code.

5. The method of claim 1, wherein the second data structure comprises:
    a version identifier field or a timestamp field,
    one or more changed data fields that include a bitmap structure or code that is examined with a dictionary to determine changed data fields available in a history table,
    a history TSN field that includes a pointer to a next latest history recording of the object if an update exists or is empty, and
    a history indicator that indicates a full-object history or a selective-object history.

6. The method of claim 1, wherein visibility to the reader processor comprises one of: a view of the state of the objects at the start of a transaction, an uncommitted read that allows the reader processor to view changes made by other modification transaction that are uncommitted, and a currently committed read based on a per-object access that captures a time or transaction state.

7. The method of claim 1, wherein:
concurrent update processors to the object that encounter a set write latch perform an action comprising one of: roll back to the start of the transaction, or wait until the write latch becomes unset; and
concurrent readers of the object ignore the write latch setting.

8. A computer program product for in-place updates with concurrent reads, the computer program product comprising a non-transitory computer readable storage device having program code embodied therewith, the program code executable by a processor to:
set, by an update processor, a write latch in a first data structure associated with an object, wherein the first data structure comprises one or more changed data indicator fields;
copy, by the update processor, the first data structure to a storage structure;
set, by the update processor, a history tuple sequence number (TSN) of the first data structure to point to a TSN of the copied first data structure;
set, by the update processor, the version identifier of the first data structure to point to a transaction identification for the object, and unsetting the write latch;
update, by the update processor, one or more data portions of the first data structure;
read, by a reader processor, the version identifier from the first data structure;
determine, by the reader processor, whether the version identifier of the first data structure is visible to the reader processor;
upon the version identifier of the first data structure being visible to the reader processor, accessing, by the reader processor, the first data structure and determining whether the version identifier of the first data structure changed since starting the access;
examine, by the update processor, information in the one or more changed data indicator fields using a dictionary to determine changed data fields available in a history table;
upon the version identifier of the first data structure not being visible, perform, by the reader processor, a historical version check of the first data structure history TSN and then at previous versions of the history TSN of a second data structure; and
for each historical version, check, by the reader processor, visibility of a version identifier of the second data structure and returning one or more data portions of the second data structure from an access request transaction upon the version identifier of the second data structure being visible.

9. The computer program product of claim 8, further comprising program code executable by the processor to:
for selected history for the object:
set, by the update processor, a changed data portion of the first data structure to point to updated data portions of the first data structure; and
read, by the reader processor, the changed data portion of the first data structure and if an accessed field is marked as changed, then for each historical version, check visibility of a version identifier of the second data structure and return one or more data portions of the second data structure from an access request transaction upon the version identifier of the second data structure being visible, otherwise read, by the reader processor, a create-version identifier field from the first data structure and verify the version identifier of the first data structure is visible to the reader processor and perform the access, otherwise skip reading the first data structure.

10. The computer program product of claim 8, wherein the first data structure comprises:
a version identifier field that is convertible to a timestamp field after the transaction is committed,
a create version identifier field that is convertible to a timestamp field after the transaction has committed,
a history TSN field that includes a pointer to a next latest history recording of the object if an update exists or is empty, and
a plurality of object fields,
wherein the information of the one or more changed data indicator fields includes a bitmap structure or code.

11. The computer program product of claim 8, wherein the second data structure comprises:
a version identifier field or a timestamp field,
one or more changed data fields that include a bitmap structure or code that is examined with a dictionary to determine changed data fields available in a history table,
a history TSN field that includes a pointer to a next latest history recording of the object if an update exists or is empty, and
a history indicator that indicates a full-object history or a selective-object history.

12. The computer program product of claim 8, wherein visibility comprises one of: a snapshot isolation view of objects, an uncommitted read that provides a transaction to view changes made by other modification transaction that are uncommitted, and a currently committed read based on a per-object access that captures a time or transaction state.

13. The computer program product of claim 8, wherein:
concurrent writers to the object that encounter a set write latch, perform an action comprising one of: roll back to the start of a transaction, wait until the latch becomes unset; and
concurrent readers of the object ignore the write latch setting.

14. A system comprising:
a storage device configured to store one or more databases;
a processor configured to:
copy a first data structure to the storage device, wherein the first data structure is associated with an object, and the first data structure comprises one or more changed data indicator fields;
set a history tuple sequence number (TSN) of the first data structure to point to a TSN of the copied first data structure;
set the version identifier of the first data structure to point to a transaction identification for the object;
unset the write latch portion;
update one or more data portions of the first data structure;
read the version identifier from the first data structure;
determine whether the version identifier of the first data structure is visible for a transaction including isolation requirements;
upon the version identifier of the first data structure being visible to the transaction isolation requirements, access the first data structure and determine whether the version identifier of the first data structure changed since starting the transaction;

examine information in the one or more changed data indicator fields using a dictionary to determine changed data fields available in a history table;

determine that the version identifier of the first data structure is not visible to the transaction isolation requirements;

upon the version identifier of the first data structure not being visible, perform, by the reader processor, a historical version check of the first data structure history TSN and then at previous versions of the history TSN of a second data structure; and for each historical version, check visibility of a version identifier of the second data structure and return one or more data portions of the second data structure from an access request transaction upon the version identifier of the second data structure being visible.

15. The system of claim 14, wherein the processor is further configured to:

set, for selected history for the object, changed data portions of the first data structure to point to updated changed data portions of the first data structure that are currently being changed; and read, for selected history for the object, the changed data portions of the first data structure and if an access field is marked as changed data, then for each historical version, check visibility of a version identifier of the second data structure and returning one or more data portions of the second data structure from an access request transaction upon the version identifier of the second data structure being visible, otherwise read a create-version identifier field from the first data structure and verify the version identifier of the first data structure is visible to the transaction isolation requirements and perform the accessing, otherwise skip reading the first data structure.

16. The system of claim 14, wherein:

the first data structure comprises:

a version identifier field that is convertible to a timestamp field after the transaction is committed, a create version identifier field that is convertible to a timestamp field after the transaction has committed, a history TSN field that includes a pointer to a next latest history recording of the object if an update exists or is empty, a plurality of object fields; and the information of the one or more changed data indicator fields includes a bitmap structure or code that is examined with a dictionary to determine the changed data fields available in the history table; and the second data structure comprises:

a version identifier field or a timestamp field, the one or more changed data fields include a bitmap structure or code, a history TSN field that includes a pointer to a next latest history recording of the object if an update exists or is empty, and a history indicator that indicates a full-object history or a selective-object history.

17. The system of claim 14, wherein:

concurrent writers to the object that encounter a set write latch portion roll back to accessing a prior version of the object; and concurrent readers of the object ignore the write latch portion setting.

* * * * *